March 24, 1970  O. PFRENGLE  3,502,304
PROCESS AND APPARATUS FOR PRODUCING AGGLOMERATES
Filed Nov. 21, 1966  3 Sheets-Sheet 1

INVENTOR
Otto Pfrengle
BY *Marn & Jangarathis*
ATTORNEYS

March 24, 1970     O. PFRENGLE     3,502,304
PROCESS AND APPARATUS FOR PRODUCING AGGLOMERATES
Filed Nov. 21, 1966     3 Sheets-Sheet 2

INVENTOR.
Otto Pfrengle
BY *Marn & Jangarathis*
ATTORNEYS

INVENTOR.
Otto Pfrengle

BY

Marn & Jangarathis
ATTORNEYS

United States Patent Office 3,502,304
Patented Mar. 24, 1970

3,502,304
PROCESS AND APPARATUS FOR PRODUCING
AGGLOMERATES
Otto Pfrengle, 13 Idsteiner Strasse,
62 Wiesbaden, Germany
Filed Nov. 21, 1966, Ser. No. 595,788
Claims priority, application Germany, Nov. 26, 1965,
C 37,509, C 37,510
Int. Cl. B01f 15/00
U.S. Cl. 259—3                                35 Claims

ABSTRACT OF THE DISCLOSURE

An apparatus and method for producing agglomerates wherein the agglomerates are produced by introducing powder into one end of a rotating drum and providing a liquid spray at the one end thereof which is directed to the bottom of the drum at an inclined angle with respect to the axis of the drum thereby imparting a component of motion to the powder surface in a direction toward the other end of the drum through which the resulting agglomerates are withdrawn. The spray may be introduced through jet mixing nozzles, permitting the simultaneous mixing and spraying of two different liquids. In accordance with a preferred embodiment, the interior of the drum is provided with a plurality of mixing vanes inclined at an angle with respect to the axis of the drum which continuously lift powder from the bottom of the drum and return the powder to a point in the drum closer to the spray, thereby imparting a component of motion in a direction opposite to the motion caused by the spray, resulting in increased mixing.

This invention is related to the production of powder agglomerates or granules and, more particularly, to a process and apparatus for continuously mixing a liquid or liquids with a powder or powders to produce light, voluminous agglomerates.

Continuous processes for producing agglomerates or granules are known in the art, but are not effective for all applications. Thus, for example, it is known in the art to produce agglomerates or granules by spraying a liquid into a fluidized bed of solids. In accordance with the known process, solids are continuously introduced into the top of the bed and are maintained in a fluidized state by the introduction of an air stream at the bottom thereof. A liquid spray is continuously introduced into the bed at the side thereof and as a result of the contact between the fluidized solids and liquid spray, agglomerates are formed which are sufficiently heavy to be withdrawn from the bottom of the bed countercurrent to the flow of the fluidizing air stream. This process, however, is not suitable for solids having different shapes and bulk weight, since the air stream functions as an air classifier. Accordingly, detergents which are produced from raw materials of various grain sizes and bulk weights may not be produced by this process. In addition, only unary fluid pressure nozzles having a small bore may be used for spraying the liquid into the bed, thereby limiting the process to non-viscous liquids.

An object of this invention is to provide a new and improved process and apparatus for producing powder agglomerates.

Another object of this invention is to provide a process and apparatus for producing light, voluminous agglomerates or granules.

A further object of this invention is to provide a process and apparatus for producing agglomerates by the mixing of a powder and a liquid.

Still another object of this invention is to provide a process and apparatus for producing agglomerates from a mixture of powders and liquids.

A still further object of this invention is to provide a process and apparatus for achieving the above-mentioned objects in a continuous manner.

These and other objects should become more fully apparent from the following detailed description of the invention when read with reference to the accompanying drawings wherein.

The objects of this invention are broadly accomplished by continuously introducing a powder into a rotating drum wherein the powder is contacted with a liquid spray. As a result of the contact between the liquid spray and powder, agglomerates or granules are formed which are continuously withdrawn from the drum. In a distinct embodiment of the invention, a means is provided within the drum to direct a component of motion against the powder in a direction opposite to the direction in which the agglomerates are withdrawn from the drum.

More particularly, a powder to be agglomerated is introduced into one end of a rotating drum containing no separately moving mixing or stirring tools, and continuously mixed with a liquid introduced therein through one or more spray jets. The powder surface is continuously renewed by the rotating drum and the powder continuously moves to the discharge end of the drum, as hereinafter more fully described. The length of the drum is long enough so that the powder and liquid are sufficiently mixed therein to produce a homogeneous product. In order to produce such a homogeneous product, the ratio of drum length to drum diameter should be between about 1.1:1 and about 3:1, preferably between about 1.3:1 and about 2.5:1. The length to diameter ratio may be greater, provided that the spraying zone is followed by a non-spraying zone wherein drying of the agglomerates is affected.

The jets for introducing the liquid or liquids into the drum are positioned in one end of the drum and are directed in a laterally downward direction toward the opposite end thereof. The jets are arranged so that their spray area effectively covers the powder surface and when more than one jet is employed, the jets are arranged to prevent a great overlap in spray area.

The spray from the jets strikes the powder in the drum at an angle and the kinetic energy thereof imparts a component of motion to the powder in a direction toward the opposite or discharge end of the drum. This effect of the jet spray may be increased by inclining the lower generatrix of the drum at an angle toward the discharge end thereof, with the angle generally being no greater than about 12° when using cylindrical-shaped drums and no greater than about 16° with conical-shaped drums. Alternatively, the jets may be directed vertically downward, with the powder being moved toward the discharge end of the drum solely by the inclination thereof, but generally this is a less preferred embodiment.

The jets may be either compressed air jets (two fluid nozzles) or hydraulic pressure jets (unary jets) with the former being preferred since they have a larger diameter, e.g., a 6 to 8 mm. bore, and consequently can be used for spraying highly viscous liquids and slurries, without the risk of the jets becoming clogged. As a distanct feature of the invention, mixing jets are employed to spray two different liquids onto the powder surface. The use of mixing jets produces a more homogeneous liquid or slurry for spraying and also permits two liquids which normally cannot be premixed, e.g., mixing of the liquids results in a highly viscous mixture not suitable for spraying, to be sprayed simultaneously as a homogeneous mixture onto the powder surface. The mixing jets may be either hydraulic mixing jets wherein two pressurized liquids are mixed either in the jet or preferably right after leaving the jet, or preferably air pressure mixing jets wherein the two liquids meet at the end of the jet or immediately behind the end thereof. The type of air mixing jet generally employed has a central bore which is encircled by two concentric ring canals, with the two liquids passing through the central bore and inner canal, respectively, and the compressed air passing through the outer ring canal. This type of jet produces a fine and uniform spray. The air jets may use cold air, hot air, or steam and, if hot air is used, the liquids will be partially concentrated during spraying, e.g., spray droplets of aqueous solutions are concentrated by evaporation of water. The choice of the particularly jet or mixing jet to be employed is deemed to be within the scope of those skilled in the art from the teachings contained herein and since these jets are generally known in the art, no further description thereof is deemed necessary.

The jets are preferably positioned so as not to be totally inside the drum, but only partially extending into one end thereof. In this type of arrangement, the jets may be cleaned or interchanged, if necessary, while the drum is in operation. In addition, this type of arrangement reduces the fouling and encrustation of the jets that frequently occurs when the jets are placed inside the drum.

In a distinct embodiment of the invention, the interior wall of the drum is provided with a plurality of mixing vanes which are inclined at an angle with respect to the axis of the drum. The degree and direction of the angle are chosen so that during rotation of the drum, powder is lifted by the vanes and during passage of the vanes from the lowest point of their circular path to the highest point thereof, the lifted powder slides off the vanes, in a direction away from the discharge end of the drum. In this manner, the powder within the drum is subjected to a component of motion in a direction opposite to the direction of overall flow within the drum, resulting in a more effective mixing of powder and liquid spray.

The vanes may have either straight or bent edges and, if bent edges are employed, the angle is small enough to permit powder to flow off the vanes during the rising portion of the circular path. In general, little or no bending of the vane edges is preferred. The height of the vanes is small enough so that during the lowest portion of the circular path the vanes are completely covered with powder, thus preventing any spray from directly hitting the vanes. In general, many small vanes are employed instead of a few wide vanes.

The volume of powder maintained in the drum is small enough to effect efficient mixing and spraying of the powder, with the exact volume being dependent upon the particular powder employed and the final product desired. Thus, for example, low powder volumes are employed to produce coarse-grained, voluminous agglomerates consisting of many small particles having air spaces therebetween. If the interior of the drum contains a plurality of vanes, as hereinabove described, the powder volume and vane height must be correlated so that the vanes are completely covered with powder during the lowest portion of the vane's circular path. In general, the drum contains less than 40% of powder, preferably less than 25% and more preferably less than 20%, all by volume. A convenient means for maintaining the desired volume within the drum is to provide the interior of the drum with a baffle over which the product must flow to reach the discharge end of the drum. The width of the baffle controls the volume of material in the drum and the width of the baffle is generally between about one-quarter and about one-fortieth of the average drum diameter.

The interior of the drum may be divided into two chambers, with spraying of the powder being effected in one chamber and drying of the resulting agglomerates in the other. The two chambers may be separated from each other by any suitable means, e.g., a baffle, so long as the two chambers are maintained in a fluid flow relationship. The agglomerates introduced into the drying chamber are generally mixed with dry powder in order to both increase the flowability thereof and reduce the tendency for lumps to be formed.

The drum may also be provided with a means for separating fines from the resulting agglomerates. Thus, for example, an air flow may be generated in the interior of the drum by an exhaust fan, with the fines being entrained in the air and removed from the drum. The fines separated from the agglomerates may be recovered and recycled to the agglomeration process.

In operation, the drum is rotated at a speed fast enough to continually overturn and renew the powder surface, with the powder forming a constantly rising, inclined plane toward the drum wall. The speed, however, is not fast enough so that the centrifugal force generated thereby prevents the powder from falling to the lower portion of the drum. In general, the drum is rotated at a speed between about 6 and about 60 r.p.m., preferably between about 15 and about 40 r.p.m. If the interior of the drum is provided with mixing vanes, the drum is preferably rotated at a speed between about 3 and about 35 r.p.m. It is to be understood, however, that if higher speeds are contemplated, the angle of inclination of the vanes with respect to the axis of the drum should be greater than at lower speeds. The exact speed to be used, either with or without vanes, is determined by the powdery material employed and the product produced, with higher speeds being necessary for imparting an overturning motion to free flowing materials, and lower speeds for sticky, nonflowing materials. The free flowing materials generally require higher speeds since at lower speeds a level balancing results from the lateral movement thereof.

The drum, as noted hereinabove, does not contain any mixing or stirring tools which move separately with respect to the drum. The use of such tools, although aiding the mixing process, imparts a striking motion to the powder and formed agglomerates in the drum which hampers effective spraying of the material and prevents the formation of a coarse grained voluminous product. Accordingly, the mixing is solely effected by the rotary motion of the drum and the motion effected by the jet spray and mixing vanes.

The invention will be further described with reference to the specific embodiments thereof illustrated in the accompanying drawings. It is to be understood, however, that these embodiments are only illustrative of the invention and the scope of the invention is not to be limited thereby.

Figure 1:
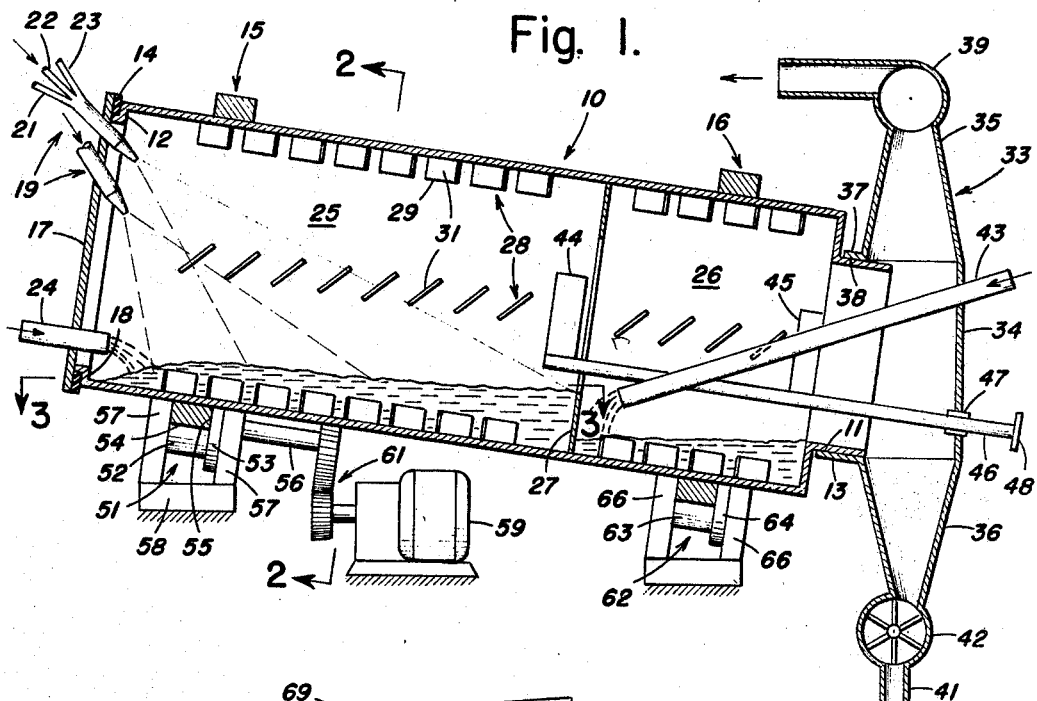
FIGURE 1 is a front elevational cross-sectional view of an embodiment of the apparatus of the invention.

Referring now to FIGURE 1, a hollow, open ended substantially horizontally disposed cylindrical drum 10 contains a neck portion 11 at the discharge end and a neck portion 12 at the inlet end thereof. The outer periphery of the neck portion 11 defines a bearing surface 13. A pair of support rings 15 and 16 are rigidly mounted on the exterior of the drum 10 to support and drive the drum 10, as hereinafter described. The drum is inclined at an angle to the horizontal to facilitate movement of material therein, as hereinabove described.

A circular cover 17 is provided to close one end of the drum 10 and a ring bearing 14 is provided between the inner surface of cover 17 and the shoulder 18 formed by the neck portion 12 of drum 10. The cover 17 is rigidly supported (not shown) and the drum 10 rotates relative to the cover 17.

The upper portion of the cover 17 is provided with a pair of nozzles, generally indicated as 19 and which partially extend into the interior of the drum 10.

The nozzles 19 are shown as being of the jet air mixing type connected to lines 21 and 22 for the introduction of two liquids and line 23 for introduction of compressed air, but it is to be understood that the nozzles may be either hydraulic nozzles or non-mixing nozzles.

The lower portion of the cover 17 is provided with a feed pipe 24 extending into the interior of the drum 10 for introducing powder therein. The feed pipe 24 may be a screw conveyor or any other instrumentality suitable for introducing powder into the drum 10.

The interior of the drum 10 is divided into a spraying chamber 25 and a drying chamber 26 by any annular baffle 27 mounted on the inner periphery of the drum 10. The baffle 27 is positioned so that the spraying chamber 25 has a length sufficient to fall within the hereinabove described required length to diameter ratios. The width of the annular baffle 27 is chosen to provide the desired depth of powder in spraying chamber 25.

The spraying chamber 25 and the drying chamber 26 are each provided with three rows of vanes 28 mounted on the inner periphery of the drum. Although only three rows of vanes are shown in each of chambers 25 and 26, it is to be understood that more or less than this number of rows may be provided depending on the contemplated operation of the drum. The vanes 28 are positioned so that the inner edges 29 thereof are inclined at an angle to the horizontal and the drum is rotated in a direction such that the surfaces 31 of the vanes 28 are inclined in a direction toward the feed inlet 24 during movement of the vanes from the lowest point of their circular path to the highest point thereof. Accordingly, in operation, the drum 10 is rotated in the direction schematically indicated in FIGURE 2 by the arrow 32, and the powder lifted by the vanes 28 falls from the surfaces 31 thereof during the upper flight of the drum 10 in the direction of the feed inlet 24. Consequently, the vanes 28 impart a component of motion to the powder in a direction opposite to the overall flow of powder toward the discharge end.

A rigidly supported separation chamber 33 having a generally cylindrical central portion 34, conically tapering upper and lower portions 35 and 36, respectively, contains a substantially horizontally disposed neck portion 37 telescoping the neck portion 11 of the drum 10. The inner periphery of the neck portion 37 defines a journal surface 38 with the bearing surface 13 defined by the neck portion 11, forming a seal between the separation chamber 33 and the drum 10 and permitting rotation of the drum 10 relative to the separation chamber 33.

The upper portion 35 of the separation chamber 33 is provided with an exhaust fan 39 for withdrawing fines. The lower portion of separation chamber 33 is provided with a product outlet 41 containing a valve 42 for controlling the flow of agglomerates therefrom. The separation chamber 33 is further provided with a dry powder feed inlet 43 which extends therethrough into the feed end of the drying chamber 26. The feed inlet 43 may be a screw conveyor or any other suitable means for introducing powder into the interior of the drum.

The spraying chamber 25 and the drying chamber 26 are also provided with vanes 44 and 45, respectively, mounted on a horizontally disposed rod 46. The rod 46 is slidably and rotatably supported in a bushing 47 positioned in the exterior wall of separation chamber 33 and contains a handle 48. The vanes 44 and 45 are maintained in an upright position, as shown, during operation of the drum 10 and when the operation is completed, the vanes 44 and 45 are rotated and moved within the chamber 25 and 26, respectively, to withdraw any product remaining therein.

Figure 2:
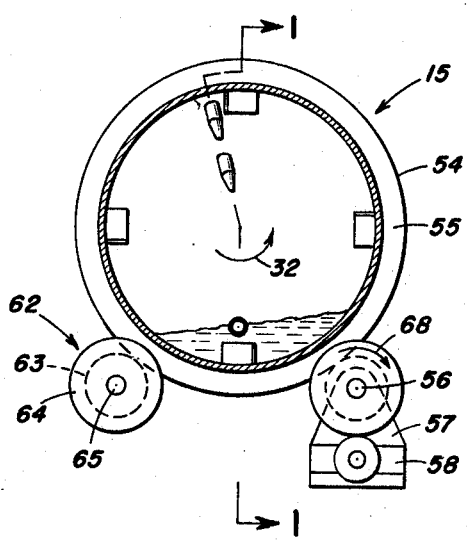
FIGURE 2 is a section taken along line 2—2 of FIGURE 1.

The drive mechanism of the drum, as shown in FIGURES 1 and 2, is comprised of a drive roller 51, containing a drive portion 52 and a positioning portion 53 of a diameter greater than the diameter of the drive portion 52. The drive portion 52 of the drive roller 51 is in driving engagement with the surface 54 of support ring 15 and the positioning portion 53 of the drive roller 51 abuts against the surface 55 of the support ring 15 to prevent the drum from moving in a horizontal direction. The drive roller 51 is rigidly mounted on a shaft 56 which is rotatably mounted in journal support members 57, supported by a pedestal 58. The shaft 56 is rotated by a motor 59 through a speed reduction gear train generally indicated as 61.

The drum 10 is further supported by three idler rollers 62 (only two are illustrated) on which the support rings 15 and 16 are received. Similar to the drive roller 51, the idler rollers 62 contain an idler portion 63 and a positioning portion 64 having a diameter greater than the diameter of the idler portion 63. The drive rollers are rigidly mounted on shafts 65 which are rotatably mounted in journal support members 66, supported by pedestals 67. Thus, the drum 10 has a four-point support structure.

Figure 3:
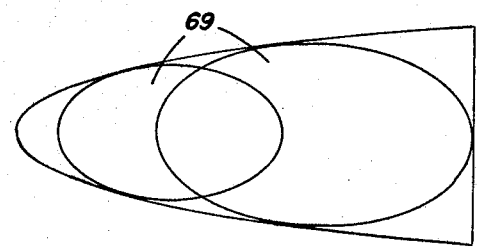
FIGURE 3 is a schematic representation of the spray area and powder surface in the embodiment of FIGURE 1.

In operation, the motor 59 rotates the shaft 56 and the drive roller 51 in the direction of the arrow 68, as illustrated in FIGURE 2. The drive roller 51 drivingly engages the support ring 15 which is rigidly mounted on the drum 10, thereby driving the drum 10 in the direction of the arrow 32. Dry powder is continuously introduced into the spraying chamber 25 of the rotating drum 10 through feed inlet 24 and contacted therein by sprays emanating from jet nozzles 17. The jet nozzles 17 are inclined at an angle such that substantially the entire surface area of the powder in spraying chamber 25 is contacted with the spray, as shown more clearly in FIGURE 3, wherein the spray areas of the nozzles 17 are generally indicated as 69 and the powder surface is generally indicated as 71. As a result of the rotation of the drum, the surface of the powder is continually renewed and accordingly, the spray continuously contacts a fresh powder surface. The contact between the spray and powder causes the powder to form agglomerates during passage through the chamber 25.

The kinetic energy of the spray and the inclination of drum 10 causes the powder to both form an inclined plane and move in the direction of the discharge end of the drum 10. The rotating vanes 28 continuously lift material from the lower drum surface and this material falls from the inclined vanes 28 in a direction toward the feed inlet 24, thereby imparting a component of motion to the material in a direction opposite to the overall flow direction.

The overall flow direction is towards the discharge end of the drum 10 and the agglomerates formed in spraying chamber 25 continuously pass over the annular baffle 27 into the drying chamber 26. Dry powder is introduced into the drying chamber 26 through feed inlet 43 and mixed with the agglomerates by the rotary motion of the drum 10 and the mixing effect of the vanes 28. The free flowing and lump-free agglomerates are continuously passed from the drying chamber 26 into the separation chamber 33 and are contacted therein by an air blast generated by exhaust fan 39. The air blast functions as an air classifier and fines are withdrawn from the separation chamber 33 through the exhaust fan 39. The agglomerates are withdrawn from the separation chamber 33 through valve 42 and product outlet 41.

Figures 4, 7:
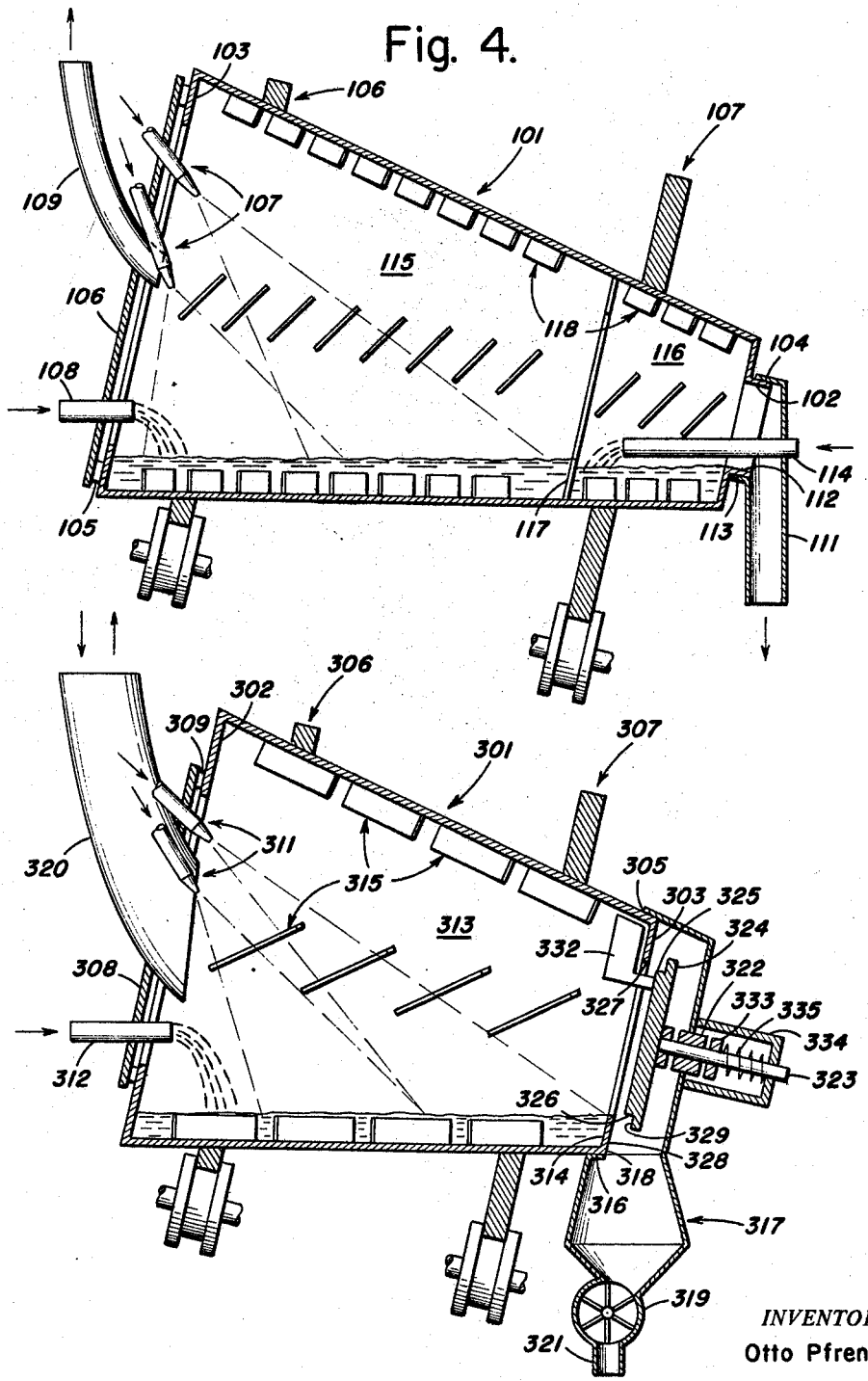
FIGURE 4 is a front elevational cross-sectional view of another embodiment of the apparatus of the invention.
FIGURE 7 is a front elevational cross-sectional view of still a further embodiment of the apparatus of the invention.

Another embodiment of the invention is illustrated in FIGURE 4 which operates in a manner similar to the embodiment illustrated in FIGURE 1.

A hollow, open ended, frusto-conically shaped drum 101 contains a neck portion 102 at the smaller diameter end and a radially extending flange 103 at the larger diameter end thereof. The outer periphery of the neck portion 102 defines a bearing surface 104. A pair of support rings 106 and 107 are rigidly mounted on the outer periphery of drum 101 to support and drive the drum 101, as hereinabove described with reference to the embodiment of FIGURE 1. The drum 101 is inclined only at a slight angle to the horizontal, e.g., 2°, to facilitate movement of material therein and, consequently, movement of the product within the drum is primarily caused by the kinetic energy of the spray.

A circular cover 106 is provided to close the larger diameter end of the drum 101 and a ring bearing 105 is provided between the inner surface of cover 106 and the outer surface of flange 103. The cover 106 is rigidly supported (not shown) and the drum 101 rotates relative to the cover 106.

The upper portion of the cover 106 is provided with a pair of jet spray nozzles, generally indicated as 107, and which partially extend into the interior of the drum 101. The nozzles 107 may be of the jet mixing type as described with reference to the embodiment of FIGURE 1 or any other type of jet nozzle, as hereinabove described. The lower portion of the cover 106 is provided with a feed pipe 108 extending into the interior of the drum 101 for introducing powder therein. The feed pipe 108 may be a screw conveyor or any other instrumentality suitable for introducing powder into the drum 101.

The cover 106 is further provided with an exhaust pipe 109, partially extending into the interior of the drum 101. The exhaust pipe 109 is connected to an exhaust fan (not shown) and functions to withdraw fines from the interior of the drum 101.

A substantially vertically disposed outlet pipe 111 contains a substantially horizontally disposed neck portion 112, telescoping the neck portion 102 of the drum 101. The inner periphery of the neck portion 112 defines a journal surface 113 with the bearing surface 104 defined by the neck portion 102, permitting rotation of the drum 101 relative to the outlet pipe 111. The outlet pipe 111 is provided with a substantially horizontally disposed dry powder feed inlet 114 which extends into the interior of the drum 101. The feed inlet 114 may be a screw conveyor or any other suitable means for introducing powder into the interior of the drum 101.

The interior of the drum 101 is divided into a spraying chamber 115 and a drying chamber 116 by an annular baffle 117 mounted on the inner periphery of the drum 101. The baffle 117 is positioned so that the spraying chamber 115 has a length sufficient to fall within the hereinabove described required length to diameter ratios. The width of the annular baffle 117 is chosen to provide the desired depth of powder in spraying chamber 115.

The spraying chamber 115 and the drying chamber 116 are each provided with three rows of vanes 118 mounted on the inner periphery of the drum 101. Although three rows of vanes are shown in each of the chambers 115 and 116, it is to be understood that more or less than this number of rows may be provided, depending on the contemplated operation of the drum. The vanes 118 are positioned as hereinabove described with reference to the embodiment of FIGURE 1, so that the vanes impart a component of motion to the material in drum 101 in a direction opposite to the overall direction of flow toward the smaller diameter end of drum 101.

In operation, the embodiment illustrated in FIGURE 4 functions similarly to the embodiment of FIGURE 1, except that fines are removed from the interior of the drum 101 through exhaust pipe 109.

Figure 5:
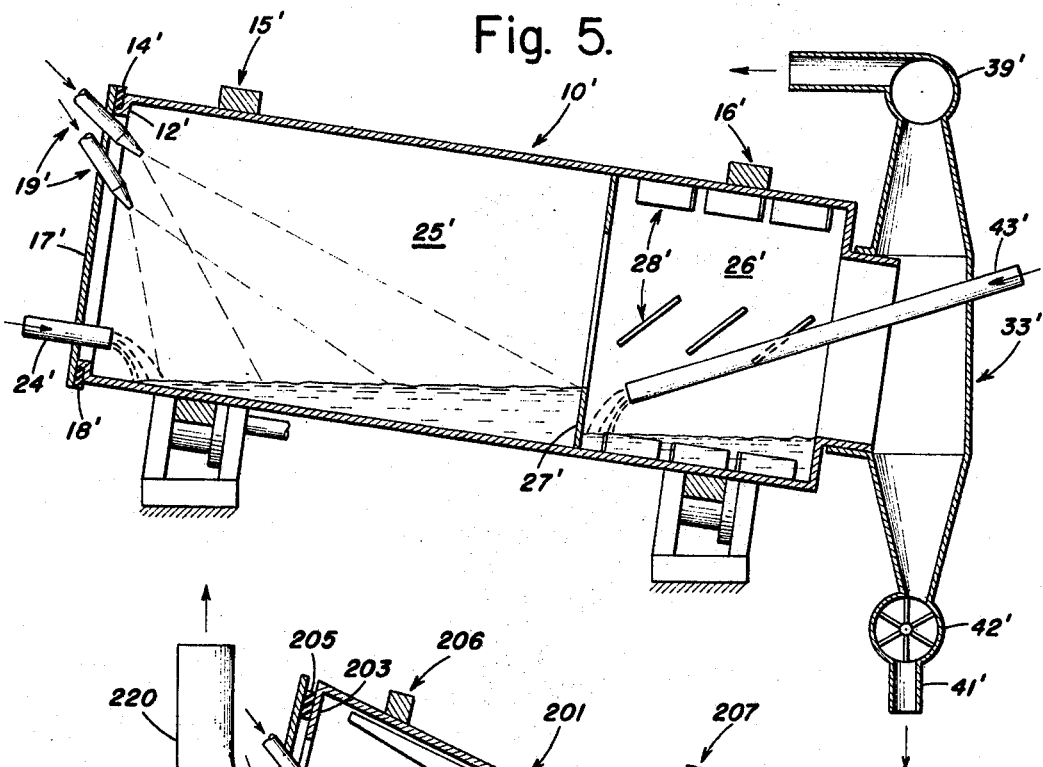
FIGURE 5 is a front elevational cross-sectional view of a further embodiment of the apparatus of the invention.

A further embodiment of the invention is illustrated in FIGURE 5 and this embodiment is essentially identical to the embodiment of FIGURE 1, with like parts being designated by like prime numerals, except that there are no mixing vanes in the spraying chamber 25'. In addition, the vanes for removing product from the drum have been omitted. The dimensions of the drum are chosen as hereinabove described, e.g., the length to diameter ratio of the spraying chamber is 1.73:1, the overall length to diameter ratio is 2.6:1 and the drum is inclined at an angle of 7¾° and functions in a manner essentially identical to the embodiment of FIGURE 1 except that there is only one component of motion directed against the material in the spraying chamber 25'.

Figure 6:
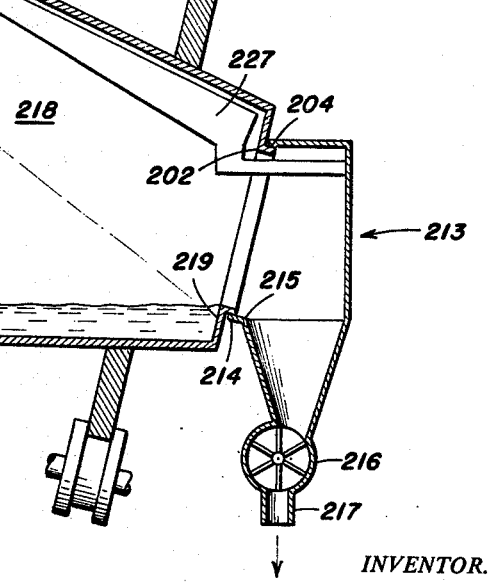
FIGURE 6 is a front elevational cross-sectional view of still another embodiment of the apparatus of the invention.

In FIGURE 6, there is shown still another embodiment of the invention, which functions in a manner similar to the hereinabove described embodiments. Referring now to FIGURE 6, a hollow, open ended frusto-conically shaped drum 201 contains a neck portion 202 at the smaller diameter end thereof and a radially extending flange 203 at the larger diameter end thereof. The outer periphery of the neck portion 202 defines a bearing surface 204. A pair of support rings 206 and 207 are rigidly mounted on the outer periphery of drum 201 to support and drive the drum 201, as hereinabove described with reference to the embodiment illustrated in FIGURE 1. The drum 201 is only inclined slightly with respect to the horizontal and, consequently, material within the drum 201 is moved primarily by the kinetic energy of the sprays.

A circular cover 208 is provided to close the larger diameter end of the drum 201 and a ring bearing 205 is provided between the inner surface of cover 208 and the outer surface of flange 203. The cover 208 is rigidly supported (not shown) and the drum 201 rotates relative to the cover 208.

The upper portion of the cover 208 is provided with a pair of nozzles, generally indicated as 211 which partially extend into the interior of the drum 201. The nozzles 211 may be of the jet mixing type or any other type of jet nozzle as hereinabove described. The lower portion of the cover 208 is provided with a feed pipe 212 extending into the interior of the drum 201 for introducing powder therein. The feed pipe 212 may be a screw conveyor or any other instrumentality suitable for introducing powder into the drum 201.

The cover 208 is further provided with an exhaust pipe 220, partially extending into the interior of the drum 201. The exhaust pipe 220 is connected to an exhaust fan (not shown) and functions to withdraw fines from the interior of the drum 201. A substantially vertically disposed outlet chamber 213 contains a horizontally disposed neck portion 214 telescoping the neck portion 202 of drum 201. The interior surface of neck portion 214 defines a journal surface 215 with the bearing surface 204 defined by the neck portion 202, permitting rotation of the drum 201 relative to the outlet chamber 213. The lower portion of outlet chamber 213 contains a valve 216 for controlling product withdrawal through an outlet pipe 217.

The interior of the drum 201 defines a spray chamber 218 in which the agglomerates are formed and these agglomerates are passed directly from the spray chamber to the outlet chamber 213. The interior surface of shoulder 219 formed by neck portion 202 functions similarly to a baffle and controls the volume of material within spray chamber 218.

The upper portion of spray chamber 218 also contains a scraper 227, extending substantially along the entire length of the inner periphery of the drum 201 and spaced therefrom. The scraper 227 is rigidly mounted on the inner wall of outlet chamber 213 and functions to prevent any material from being carried by centrifugal force over the zenith of the circular path of the drum. Accordingly, the drum 201 may be rotated at higher speeds.

In operation, the embodiment illustrated in FIGURE 6 functions similarly to the hereinabove described embodiment, with the powder being continuously introduced into the drum 201 through feed pipe 212, and formed agglomerates being withdrawn through product outlet 217, and consequently no detailed description of the operation is deemed necessary.

In FIGURE 7 there is illustrated a still further embodiment of the invention, which may be operated to effect agglomeration either as a batch or a continuous process. Referring now to FIGURE 7, there is shown a hollow, open ended, frusto-conical drum 301 containing a radially extending flange 302 at the larger diameter end thereof and a radially extending flange 303 at the reduced diameter end thereof. A portion of the outer periphery of the drum 301 at the reduced diameter end thereof defines a bearing surface 305. A pair of support rings 306 and 307 are rigidly mounted to the outer periphery of the drum 301 to support and drive the drum 301, as hereinabove described with reference to the embodiment illustrated in FIGURE 1. The drum 301 is only inclined slightly with respect to the horizontal and, consequently, material within the drum 301 is moved primarily by the kinetic energy of the sprays.

A circular cover 308 is provided to seal the larger diameter end of the drum 301 and a ring bearing 309 is provided between the inner surface of cover 308 and the outer surface of flange 302 of drum 301. The cover 308 is rigidly supported (not shown) and the drum 301 rotates relative to the cover 308.

The upper portion of the cover 308 is provided with a pair of nozzles, generally indicated as 311 which partially extend into the interior of the drum 301. The nozzles 311 may be of the jet mixing type or any other type of jet nozzle as hereinabove described. The lower portion of the cover 308 is provided with a feed pipe, generally indicated as 312 extending into the interior of the drum 301 for introducing powder therein. The feed pipe 312 may be a screw conveyor or any other instrumentality suitable for introducing powder into the drum 301.

The cover 308 is further provided with an exhaust pipe 320, partially extending into the interior of the drum 301. The exhaust pipe 320 is connected to an exhaust fan (not shown) and functions to withdraw fines from the interior of the drum 201.

The interior of the drum 301 defines a spraying chamber 313 and the interior surface 314 of flange 303 functions similarly to a baffle to control the volume of material within spraying chamber 313. The spraying chamber 313 is provided with three rows of vanes 315 mounted on the inner periphery of drum 301. Although three rows of vanes are shown, it is to be understood that more or less than this number of rows may be provided, depending on the contemplated operation of the drum. The vanes 315 are positioned as hereinabove described with reference to FIGURE 1 so that the vanes impart a component of motion to the material in drum 301 in a direction opposite to the overall direction of flow toward the smaller diameter end of the drum 301.

The reduced diameter end of drum 301 is telescopically received in an opening 316 of a vertically extending product discharge chamber 317, the inner surface of the opening 316 defining a journal surface 318 with the bearing surface 305 of drum 301. The lower portion of the chamber 317 is provided with a valve 319 for controlling the withdrawal of product through a product outlet 321.

A bushing 322 is mounted in the wall of chamber 317 and slidably and rotatably receives a rod 323 extending into the interior of the chamber 317. The rod 323 is rigidly connected to a circular cover 324 containing a neck portion 325. The outer periphery 326 of the neck portion 325 is adapted to frictionally engage the radial surface 327 of flange 303 and the surface 329 of cover 324 is adapted to frictionally engage the outer surface 328 of the flange 303.

The surface 331 of the neck portion 325 rigidly supports a vane 332 which extends into the spray chamber 313. The vane 332 is employed to aid in emptying the drum 301 by rotating the drum about the vane when the vane is in the position illustrated in FIGURE 6. During operation of the drum 301, the vane 332 is turned downwardly to prevent the vane 332 from interfering with the operation of the drum.

The portion of the rod 323 exterior to the drum 301 has rigidly mounted thereon a washer 333 and slidably mounted thereon a cylinder 334. The cylinder 334 is rigidly mounted on chamber 317 and a spring 335 is compressed between the cylinder 334 and the washer 333.

The embodiment illustrated in FIGURE 7 may be employed to effect a continuous process, as hereinabove described, with powder being continuously introduced through feed pipe 312 and agglomerates withdrawn through product outlet 321. In addition, the exhaust pipe 320 may be disconnected from the exhaust fan (not shown) and used for introducing additional powder into the drum 301.

In effecting a batch operation, the cover 324 is positioned to seal the reduced diameter end of the drum 301. The outer periphery 326 of the neck portion 325 frictionally engages the radial surface 327 of flange 303 and the surface 329 of cover 324 frictionally engages the outer surface 328 of the flange 303. The cover 324 is rotated by the drum 301. With the cover 324 in this position, the washer 333 mounted on rod 323 abuts against the bushing 322. The cover 324 is maintained in position by the force of the spring 335 acting against washer 333 and cylinder 334.

After the operation is completed, cover 324 is withdrawn to the position illustrated in FIGURE 7 and retained in this position, for example, by inserting a pin into a notch provided in rod 323 (not shown). The drum 301 may be emptied by rotating the drum 301 about the vane 332, preferably in a direction opposite to the direction employed during the agglomeration process.

The hereinabove described process and apparatus may be modified in numerous ways without departing from the scope of the invention. Thus, for example, in the frusto-conically shaped drums, the spraying may be effected from the smaller diameter end instead of from the larger diameter end. In general, however, it is preferable to effect the spraying from the larger diameter end since the spray jets can be positioned at a larger angle with respect to the powder surface, thereby increasing the overall spray area and permitting effective spraying of the entire powder surface. In addition, the exhaust pipe for withdrawing fines from the frustro-conically shaped drum may be employed at the smaller diameter end, but in general, it is preferable to use the smaller diameter end solely for product withdrawal.

In still another modification, the drum may be supported and rotated without contacting the stationary parts, i.e., the cover on which the jet nozzles are mounted or the separation or outlet chambers. The exhaust fan maintains a slight vacuum within the drum, preventing the loss of material through the air spaces between the drum and stationary parts.

The above modifications and a wide variety of other modifications should be apparent to those skilled in the art from the teachings contained herein.

The hereinabove described process and apparatus are effective for forming agglomerates or granules from a wide variety of materials. Thus, the powder to be agglomerated may comprise one material or a mixture of materials and the material or materials may be of different shapes and bulk weights. If the powder comprises various materials, the materials may be premixed prior to introduction into the drum, with mixing being further enhanced within the drum. The powder may be contacted within the drum by a liqiud or liquids, and if more than one liquid is used, the liquids may be mixed prior to introduction into the drum or may be mixed while being introduced into the drum, e.g., by jet mixing nozzles. The liquid or liquid mixtures may be readily sprayable or highly viscous liquids.

The process and apparatus of this invention are particularly effective for effecting a chemical or a physical reaction concurrently with the spraying operation. Thus, by employing jet mixing nozzles, a chemical reaction can be effected between two liquids both in the vapor phase and on the powder surface during the spraying operation. Alternatively, instead of employing jet mixing nozzles, two or more jet nozzles may be employed to spray two or more liquids, with each nozzle spraying a different liquid and the liquids from the nozzles being mixed with each other, both in the vapor phase and on the power surface. In this type of operation, in some cases, it may be preferable to maximize the overlap of spray areas to maximize contact between the liquids in both the vapor phase and on the powder surface. Thus, similar to the jet mixing nozzles, chemical reactions can be effected between two or more liquids concurrently with the spraying operation, e.g., sulfonic acid may be sprayed from one nozzle and caustic from another to produce a salt of the sulfonic acid during the spraying operation. It is further to be understood that this type of operation may be effected during either a batch or continuous operation.

The process and apparatus of the invention are particularly effective for producing grained, non-dusting, voluminous domestic detergents, heretofore produced in spray towers. Thus, for example, by the use of mixing jets, it is possible to simultaneously spray surfactants which are not mixable with each other, e.g., anionic and nonionic surfactants, onto a powdery substrate to produce a homogeneous product having a uniform distribution. However, it is to be understood that other liquids or solvents may be added to a powdery substrate, such as sodium biphosphate, sodium triphosphate, magnesium silicate, and the like, by proceeding in accordance with the teachings of the invention. The invention is an improvement over a spray tower type of operation in that there is a reduction in overall capital costs and in that the invention is applicable to liquids and pastes which may not be used in spray towers because of their temperature sensibility. Accordingly, the invention has a wider range of applicability than processes heretofore known in the art.

The teachings of the invention are also applicable to the production of technical cleaners, additions for food or fodder and other powder products. Thus, the invention is generally applicable to the production of free-flowing agglomerates or granules from liquid or liquids and powdery materials. It is to be understood, however, that the apparatus of the invention may be used for purposes other than forming agglomerates, for example, coating a powder with a liquid or liquids. These uses should be apparent to those skilled in the art from the teachings herein.

Numerous modifications and variations of the invention are possible in light of the above teachings. It is therefore to be understood that within the scope of the appended claims, the invention may be practiced otherwise than as specifically described.

What is claimed is:
1. An apparatus comprising:
 (a) a drum;
 (b) a drive means for rotating said drum;
 (c) inlet means for introducing a powdery material into one end of said drum;
 (d) outlet means for withdrawing material from the other end of said drum; and
 (e) spray means positioned within the drum at said one end of said drum, said spray means being directed toward the bottom of the drum at an inclined angle with respect to the axis of the drum, whereby spray from the spray means imparts a component of motion to the powdery material in the drum causing said powdery material to move toward said other end of the drum.

2. The apparatus of claim 1 wherein the spray means is a jet mixing nozzle, said jet mixing nozzle including means for introducing two different liquids whereby the liquids are mixed in the spray and on the powder surface.

3. The apparatus of claim 1 wherein the inlet means is positioned below the spray means.

4. The apparatus of claim 1 wherein the length of the drum is greater than the diameter of the drum.

5. The apparatus of claim 4 wherein the interior of the drum contains a baffle means, said baffle means controlling the volume of material within said drum.

6. The apparatus of claim 5 wherein the drum is a cylindrically shaped drum.

7. The apparatus of claim 4 wherein the drum is a frustro-conically shaped drum.

8. The apparatus of claim 7 and further comprising: a scraper means positioned in the drum spaced from the interior wall thereof, said scraper means being maintained in a fixed position during rotation of the drum to prevent material from passing over the top of the interior of the drum during rotation.

9. The apparatus of claim 8 wherein the drum is open-ended, and further comprising a rigidly supported cover closing said one end of the drum, said drum being rotatably movable with respect to the cover, said inlet means and spray means being mounted on the cover.

10. The apparatus of claim 9 and further comprising: an exhaust pipe mounted on the cover whereby fine material may be withdrawn from the drum.

11. The apparatus of claim 7 wherein the inlet means and the spray means are positioned at the larger end of said frustroconically shaped drum and the outlet means is positioned at the smaller end thereof.

12. The apparatus of claim 1 and further comprising a baffle means located within said drum, said baffle means dividing said drum into two chambers, said spray means effecting a spray in one of said chambers, means for introducing dry powder into the other of said chambers, and said outlet means being connected to the other of said chambers.

13. The apparatus of claim 12 wherein said means for imparting a component of motion comprises a plurality of vanes in both said chambers connected to the inner periphery of the drum, said vanes being inclined at an angle with respect to the axis of the drum.

14. The apparatus of claim 12 wherein the drum is a frustroconically shaped drum and the inlet means introduces powdery material and the spray means introduces spray at the larger end of the drum.

15. The apparatus of claim 1 and further comprising means connected to said drum for separating fines from the material in said drum.

16. The apparatus of claim 1 and further comprising means within said drum for imparting a component of motion to material contained therein in a direction away from the outlet means.

17. The apparatus of claim 16 wherein said means for imparting a component of motion comprises a plurality of vanes connected to the inner periphery of the drum, said vanes being inclined at an angle with respect to the axis of said drum.

18. An apparatus for producing agglomerates from a powdery material comprising:
 (a) a drum, said drum having a length which is greater than the average diameter of the drum, the length to diameter ratio ranging between about 1.1:1 and about 3:1;
(b) jet mixing nozzles positioned in one end of said drum, said jet mixing nozzles being directed toward the bottom of the drum at an inclined angle with respect to the axis of the drum whereby said jets can impart kinetic energy to material located in said drum, said jet mixing nozzles including means for introducing liquids into said jets;
(c) inlet means for introducing powder into said drum, said inlet means being positioned in said one end of said drum;
(d) outlet means for withdrawing material from said other end of said drum;
(e) an annular baffle positioned in the interior of said drum and connected to the interior periphery of said drum, said annular baffle being positioned between the inlet and outlet means thereby restricting flow from said inlet to said outlet means; and
(f) means for rotating said drum.

19. The apparatus of claim 18 and further comprising a plurality of mixing vanes connected to the inner periphery of said drum, said vanes being inclined at an angle with respect to the axis of the drum, and said means for rotating said drum rotating the drum in a direction such that the vanes are inclined toward said one end of the drum in passing from the lowest portion to the highest portion of their circular path.

20. An apparatus comprising:
(a) a drum, said drum being open at both ends;
(b) a cover closing one end of said drum;
(c) an inlet means for introducing material into the drum mounted on the cover;
(d) a spray means for introducing liquid into the drum mounted on said cover, said spray means being directed toward the bottom of the drum at an inclined angle with respect to the axis of the drum, whereby spray from the spray means imparts a component of motion to the powdery material in the drum causing the powdery material to move toward and out of the open end of the drum;
(e) means within the drum restricting the flow of material out of the open end of the drum; and
(f) a plurality of vane means connected to the inner periphery of the drum, said vane means being inclined at an angle with respect to the axis of the drum to impart a component of motion to the powdery material in a direction toward the inlet means.

21. The apparatus of claim 20 and further comprising a movable plate means at the open end of the drum and means for moving said plate means into and out of engagement with the open end of the drum whereby the open end of the drum may be sealed for a batch operation.

22. An apparatus comprising:
(a) a drum;
(b) a drive means for rotating said drum;
(c) inlet means for introducing a powdery material into one end of said drum;
(d) outlet means for withdrawing material from the other end of the drum;
(e) spray means for introducing liquid into the drum; and
(f) vane means connected to the inner periphery of the drum, said vane means being inclined at an angle with respect to the axis of the drum to impart a component of motion to powdery material in the drum in a direction toward the inlet means at the one end of the drum during rotation of the drum.

23. The apparatus of claim 22 and further comprising a baffle means located within said drum, said baffle means dividing said drum into two chambers, said spray means effecting a spray into one of said chambers, means for introducing dry powder into the other of said chambers and said outlet means being connected to the other of said chambers.

24. The apparatus of claim 23 wherein the drum is a frustro-conically shaped drum.

25. The apparatus of claim 24 wherein the inlet means for introducing powder and the spray means for introducing liquid are both at the larger end of said frustroconically shaped drum and the outlet means is positioned at the smaller end thereof.

26. The apparatus of claim 23 wherein the vane means are located only in the other of said chambers.

27. A process for producing agglomerates from a fine powder comprising: spraying a liquid onto one end of a bed of said powder, said spray being directed against the powder bed at an angle to impart a component of motion to the bed causing lateral movement thereof away from the spray, imparting rotary movement to the powder bed during said spraying, said spraying and movement forming agglomerates from the powder, and recovering said agglomerates from an end opposite to said one end of the powder bed.

28. The process of claim 27 and further comprising continually lifting a portion of the powder from the bed and returning said powder to the bed at a point closer to the spray than the removal point, thereby imparting a component of motion to the powder in a direction opposite to the lateral movement of the powder effected by the spray.

29. The process of claim 28 wherein said liquid spray comprises at least two different materials, said materials being mixed in the spray and on the powder surface.

30. The process of claim 29 and further comprising: adding dry powder to the bed prior to recovering the agglomerates, said powder being added to the bed at a portion thereof downstream of the spray.

31. The process of claim 27 and further comprising: introducing additional powder onto said one end of the powder bed and decreasing the surface area of the powder bed during movement of the powder from said one end to the opposite end to provide a maximum spray area at said one end.

32. An apparatus comprising:
(a) a drum having a frustroconical shape;
(b) a drive means for rotating the drum;
(c) inlet means for introducing a powdery material into the larger end of said drum;
(d) spray means for introducing a liquid spray into said larger end of the drum to contact powdery material within the drum;
(e) outlet means for withdrawing material from the smaller end of said drum; and
(f) a scraper means positioned in the upper portion of the drum and spaced from the interior wall thereof, said scraper means being maintained in a fixed position during rotation of said drum to prevent material from passing over the top of the interior of the drum during rotation.

33. The apparatus of claim 32 and further comprising: a baffle means located within said drum, said baffle means dividing said drum into two chambers, said spray means introducing liquid spray into the chamber at the larger end of the drum and means for introducing dry powder into the chamber at the smaller end of the drum.

34. A process for producing agglomerates comprising: introducing a powdery material into the larger end of a frustroconically-shaped drum to form a bed of material; spraying a liquid onto the bed of material in the larger end of said drum; rotating said drum to continuously renew the surface of the bed and move the material from the larger end of the drum to the smaller end thereof whereby the total surface area of the bed is decreased during the movement thereof, thereby providing a maximum spray area at the inlet end of the drum; and removing agglomerated material from the smaller end of the drum.

35. The process of claim 34 and further comprising: continuously lifting powdery material from the bed and continuously sprinkling the lifted material back onto the powdery bed.

References Cited

UNITED STATES PATENTS

| | | | |
|---|---|---|---|
| 2,709,833 | 6/1955 | Wiklund | 118—418 |
| 1,018,404 | 2/1912 | Baxter | 259—14 |
| 1,207,180 | 12/1916 | Kleinschmidt | 259—15 |
| 2,128,444 | 8/1938 | Vroonen | 259—3 |
| 2,761,420 | 9/1956 | Mottet | 259—81 |
| 3,083,081 | 3/1963 | Sharp et al. | |

FOREIGN PATENTS 545,196  6/1956  Italy.

ROBERT W. JENKINS, Primary Examiner

U.S. Cl. X.R.

259—14, 30